United States Patent
Lohner et al.

(10) Patent No.: US 7,347,682 B2
(45) Date of Patent: Mar. 25, 2008

(54) METHOD AND DEVICE FOR PRODUCING A WORKPIECE WITH EXACT GEOMETRY

(75) Inventors: Andreas Lohner, Putzbrunn (DE); Tim Sievers, Munich (DE)

(73) Assignee: [Bu:st]GmbH Beratungsunternehmen für Systeme und Technologien, Munich (DE)

( * ) Notice: Subject to any disclaimer, the term of this patent is extended or adjusted under 35 U.S.C. 154(b) by 106 days.

(21) Appl. No.: 10/298,412

(22) Filed: Nov. 18, 2002

(65) Prior Publication Data

US 2003/0062655 A1  Apr. 3, 2003

Related U.S. Application Data

(63) Continuation of application No. PCT/EP01/06476, filed on Jun. 7, 2001.

(30) Foreign Application Priority Data

Jun. 7, 2000 (DE) ................ 100 28 063

(51) Int. Cl.
 *B29C 35/08* (2006.01)
 *B29C 73/02* (2006.01)
(52) U.S. Cl. ............ 425/174.4; 425/375; 425/404
(58) Field of Classification Search ............ 425/174.4, 425/404, 375; 264/113, 162, 497
 See application file for complete search history.

(56) References Cited

U.S. PATENT DOCUMENTS 5,594,652 A * 1/1997 Penn et al. ............ 700/119

| 6,139,922 | A  | * | 10/2000 | Kaloyeros et al. ........ 438/758 |
| 6,144,008 | A  |   | 11/2000 | Rabinovich ............ 219/121.64 |
| 6,193,922 | B1 | * | 2/2001  | Ederer .................... 264/401 |
| 2004/0089980 | A1 | * | 5/2004 | Owada .................... 264/308 |

FOREIGN PATENT DOCUMENTS

| DE | 44 22 146 A1 | 1/1996 |
| DE | 195 33 960 A1 | 3/1997 |
| DE | 195 33 960 C2 | 3/1997 |
| DE | 196 49 856 C1 | 2/1998 |

(Continued)

OTHER PUBLICATIONS

Abstract of WO/1997/010067, Celiker, WIPO, Oct. 3, 1997.*

(Continued)

*Primary Examiner*—Yogendra N Gupta
*Assistant Examiner*—Emmanuel S Luk
(74) *Attorney, Agent, or Firm*—Heslin Rothenberg Farley & Mesiti P.C.

(57) ABSTRACT

A method and apparatus for the production of a workpiece of exact geometry and high surface quality, such as, for example, a forming tool, are disclosed. Preferably computer-controlled, the apparatus follows the method of the invention to produce the workpiece by radiation and compacting of $n_x$ successive layers of powdered starting material, each subsequent layer being formed on the uppermost surface of the previously formed layer. Following the radiation and compacting of each layer, at least one of the vertical lateral faces of the layer and of one or more underlying layers, all of which are surrounded by excess powdered starting material throughout the process, are mechanically finished, for example by a hobbing process or a peripheral grinding process.

5 Claims, 2 Drawing Sheets

FOREIGN PATENT DOCUMENTS

| DE | 198 41 892 C1 | 9/1999 |
| DE | 198 53 978 C1 | 5/2000 |
| DE | 199 05 067 A1 | 8/2000 |

OTHER PUBLICATIONS

Auszüge aus Bedienungsanleitung, EOSINT M 250 X$^{tended}$, EOS GmbH Electro Optical Systems, Kap. 5, Kap. 7, Bedienung Stand, Aug. 1999 (17 pages).

Lohner, A., "Design Rules," EOS GmbH Jan. 1997 (13 pages), date unknown.

"Prototypen aus Metall," Werkstatt und Betrieb 129 (1996) 5, p. 390.

Pfeiffer, Frank, "Euromold—Durchgängige Producktentwicklung stand im Mittelpunkt," Machinenmarkt, Würzburg 102 (1996) 3, p. 42.

* cited by examiner

METHOD AND DEVICE FOR PRODUCING A WORKPIECE WITH EXACT GEOMETRY

CROSS REFERENCE TO RELATED APPLICATIONS

This application is a continuation of International Patent Application Number PCT/EP01/06476 (pending), filed Jun. 7, 2001 and claims priority from German Patent Application Number DE 100 28 063.3, filed Jun. 7, 2000. The entire content of the prior applications is incorporated herein by reference.

FIELD OF THE INVENTION

This invention relates to a method for the production of a workpiece, for example, a forming tool, of exact geometry and high surface quality, by the successive compacting, for example, by means of electromagnetic radiation or particle radiation, of powdered starting material that is applied in layers, and by the subsequent mechanical finishing of the surfaces, as well as an apparatus for the production of such a workpiece.

BACKGROUND OF THE INVENTION

A method of the afore-mentioned type is known from German Patent Document DE195 33 960 C2. According to the prior method, one material layer is applied on a base in the form of a trace and is subsequently fused or compacted, respectively, by means of a laser beam. Subsequently, a second layer is applied and compacted, and so on, with the number of the layers applied and compacted by means of a laser beam depending on the desired height of the workpiece. On applying a new layer, the new layer always combines with the surface of the layer applied before. The powder-metallurgical production of the workpiece is followed by a finishing of both the lateral faces and the upper surface by way of a cutting process. Additionally, according to this method, non-melted starting material is continually removed from the work area by blowing or sucking it off.

With this method, comparatively short production times can be achieved for exactly dimensioned workpieces when the radiation device and the mechanical processing device are computer-controlled. There is, however, a significant problem associated with this method in that the edges of the workpiece produced, i.e., the lateral faces, a non-uniform material consistency is generated and porosities in the material may occur. As a solution to this problem, the suggests fusing the material beyond the desired contour dimension and removing the distinctly projecting edges of the workpiece during the subsequent mechanical finishing. While this is an effective solution, it significantly increases working expenses, both with regard to the working time and tool costs.

SUMMARY OF THE INVENTION

It is therefore an object of the present invention to provide a method and an apparatus for producing a workpiece of exact geometry, wherein the mechanical surface finishing is minimzed with respect to the amount of material having to be removed, and wherein an excellent surface quality, for example, as is especially required for forming tools, is simultaneously achieved.

In accordance with the principles of the present invention, during the production of the workpiece, it is surrounded powdered starting material. Preferably, this is achieved by applying the powdered starting material in layer-thickness on a base over an area that exceeds the outer contour of the workpiece, and by effecting the powder compaction in traces, with the trace width corresponding to the sphere of action of a radiation beam. In this way, it is possible to adjust the material properties in the outer contour edge of the workpiece by means of an exact control of the compacting beam. The radiation beam may, for example, be an electromagnetic beam or a particle beam.

It is well-known that the proportion of molten phase of the starting material increases with increasing beam power or energy supplied per area unit, resulting in increased compacting of the material and improved mechanical properties. In the edge or vertical lateral faces of the workpiece, however, this increased compacting of the powdered material will also lead to increased porosity and thus, to a material structure that does not, despite subsequent mechanical finishing, yield the high surface quality desired in the workpiece.

According to a preferred embodiment of the present invention, the edge areas of the workpiece are compacting by repeated radiation of the same powder layer, and powder from the surrounding powder bed may, in a subsequent radiation, be compacted in the contour edge area of the workpiece in a minimal thickness at low beam intensity, and minimal subsequent mechanical finishing will be required. The first radiation is preferably performed at a high energy density such that the sphere of action of the radiation extends just inside and along the final contour line of the workpiece and the second radiation is staggered outward from the first radiation and covers the final contour line of the workpiece.

It is of particular advantage that the mechanical finishing of the vertical lateral faces of the workpiece is performed in surrounding powdered starting material. In this manner, the surrounding powder may be used as an abrasive material, as well as a filling agent, for addressing any remaining porosity in the lateral faces. The loose powder particles can fill in any open pores by cold welding and can operate as an abrasive material for removing any projecting powder particles that have already been compacted by the energy beam. Accordingly, minimal mechanical working depths are thus sufficient, which again allows for high feed rates. These beneficial effects of the surrounding loose powder are achieved in a particularly advantageous manner when the mechanical finishing process is a hobbing or a peripheral grinding process.

A further improvement in the surface quality of the workpiece may be achieved, without increasing the necessary working time, by applying the mechanical finishing process not only to the last applied layer (layer n), but also to a plurality or all of the underlying layers (layer n to layer $n_x$). The end result is that the vertical lateral face of each layer is mechanically finished several times, providing a superior lateral surface of the finished workpiece.

BRIEF DESCRIPTION OF THE DRAWINGS

The method of the present invention may be explained with reference to the accompanying drawings, wherein.

DETAILED DESCRIPTION OF THE INVENTION

Figure 1:
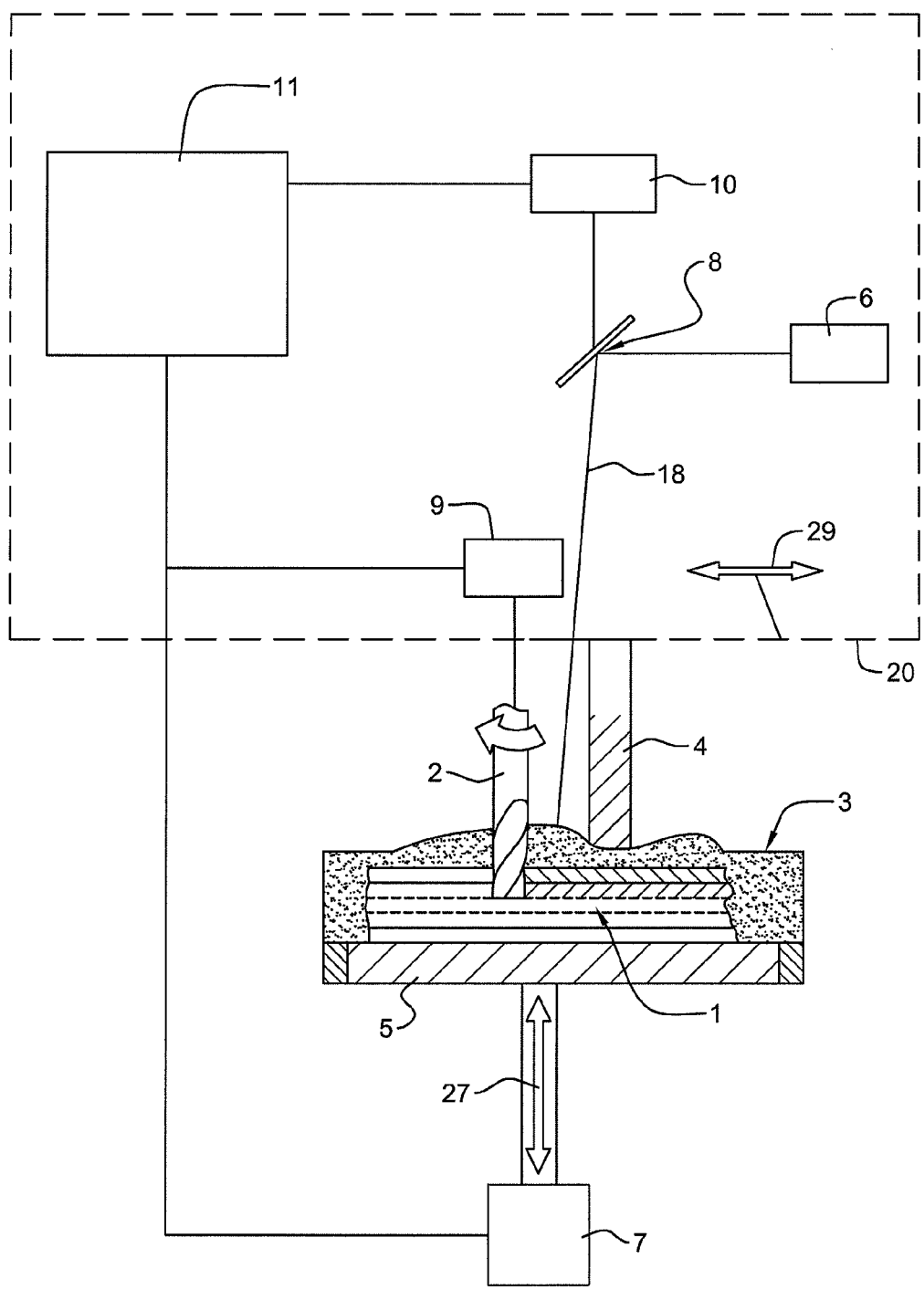
FIG. 1 is a schematic illustration of an apparatus according to the invention for performing the method according to the invention.

FIG. 1 depicts an apparatus of the present invention, for the production of a workpiece 1 according to a method of the present invention. According to the method, powdered starting material 3 is applied at a predetermined thickness on a work table 5 that is vertically movable according to arrow 27, by means of a lifting device 7, which is computer-controlled by a control device 11. The thickness of the starting material for the first layer equals the thickness of layer n, subsequent volumes of powder will be applied at a thickness equal to layer $n_1$, layer $n_2$, as illustrated, and through the desired number of layers ($n_x$). The surface area covered by the powdered starting material will exceed the desired final contour of workpiece 1.

As seen in FIG. 1, the apparatus of the present invention also includes a processing unit 20, which is constructed such that it is vertically and horizontally movable over work table 5, according to arrows 27 and 29; the movement of processing unit 20 is also computer-controlled by a control device 11, as is the vertical movement of lifting device 7. Processing unit 20 comprises a radiation source 6; a guiding device, depicted in the illustrated example as one or more mirrors 8, which are actuated by an actuating unit 10, and direct the beam 18 emanating from the radiation source 6, by means of a two-coordinate control on work table 5, which is in correspondence with the contour of the workpiece being produced; and a processing device 2 for mechanical finishing.

In the embodiment illustrated in FIG. 1, processing device 2 is a milling tool, operatively connected to drive unit 9, which is also controlled by computerized control unit 11. Milling tool 2 performs a hobbing process to mechanically finish at least one of the vertical lateral faces of workpiece 1. Additionally, a dressing bar 4, may be mounted on a lower horizontal surface of processing unit 20, and can operate to maintain powdered starting material 3 at a constant layer thickness through the transverse movement of processing unit 20 relative to work table 5. In a further embodiment of the apparatus, dressing bar 4 may be designed to also operate as a feeding device for the application of powdered starting material 3.

After the first layer of powdered starting material 3 has been applied to work table 5, the material is compacted in a desired trace by controlled movement of radiation beam 18, and optionally, by the relative movement of processing unit 20 to work table 5. Following the radiation and compacting of the powdered starting material, milling tool 2 mechanically finishes the lateral edge of the first compacted material layer, through the movement coordinates corresponding to the final contour of workpiece 1 being produced.

Following the completion of the first layer, a second layer of powdered starting material 3 is applied to the upper surface of the compacted first layer and undergoes the same radiation and compacting steps as the first layer. Following radiation and compacting of the second layer, milling tool 2 is adjusted in height such that at least the two most recently compacted material layers will be finished laterally by milling tool 2. The processing device, depicted in this embodiment as milling tool 2, may be further adjusted such that several or all of the compacted layers may be mechanically finished simultaneously. As this aspect of the invention will require an increase in the tool shaft length, depending upon the number and thickness of layers being produced, it may be desirable to limit the number of layers being simultaneously finished.

After radiation, compacting and lateral finishing of each individual material layer has been completed, a subsequent layer of powdered starting material 3 is applied to the upper surface of the topmost layer, for example, by way of dressing bar 4, or other type of powder-feeding device. This successive layering of compacted starting material is repeated until the desired number of layers ($n_x$) have been produced.

After the production of each successive compacted layer, work table 5 is lowered by one layer-thickness by way of lifting device 7.

Through the two-coordinate control of the compacting beam and, where appropriate, of the processing unit 20, very complex and intricately shaped workpieces, for example workpieces having very deep cuts or grooves, may be produced.

Figure 2:
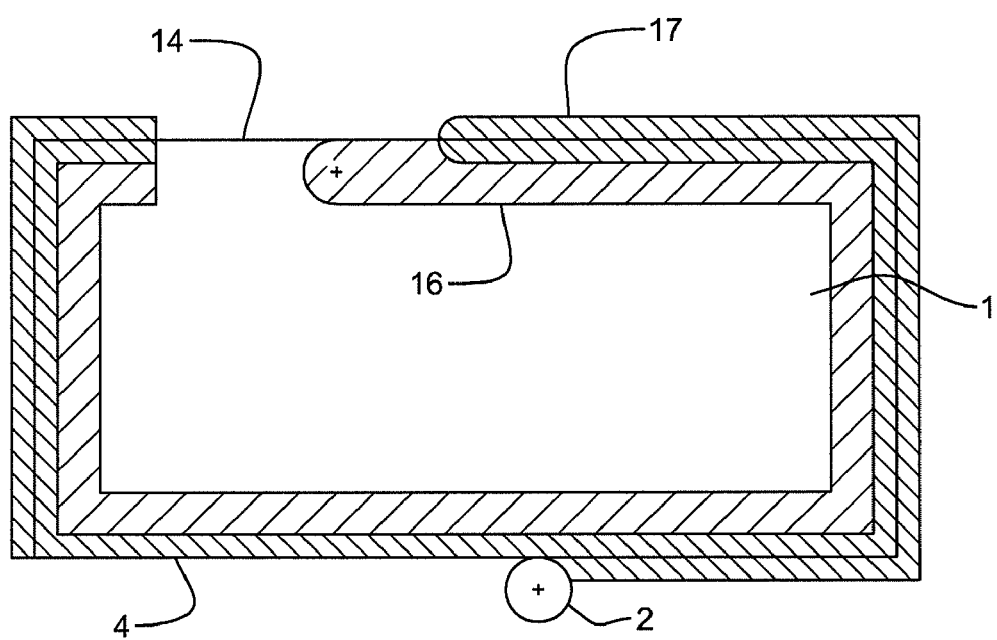
FIG. 2 is a top plan view of a workpiece to be manufactured with a schematic illustration of the powder compacting and the mechanical finishing.

The top plan view of FIG. 2 illustrates the generation of the edge area of a workpiece having a substantially rectangular contour, as depicted by line 14. In order to obtain a high surface quality of the lateral contour surfaces of the workpiece, the edge area of workpiece 1 may be repeatedly radiated.

According to one embodiment, a first radiation, corresponding to trace 16, is performed at high energy density, with the sphere of action of the radiation, i.e., the trace width, extending inwardly from contour line 14. A second radiation, corresponding to trace 17 and preferably performed at a lower energy density, is staggered outwardly from the first radiation and covers contour line 14. Compacting trace 17 is distinctly narrower than first trace 16. Due to the low energy density of trace 17, it only has to minimally extend beyond contour line 14, to achieve a very high surface quality of the lateral face by the subsequent hobbing process performed by milling tool 2. Similar repeated radiations may also be employed to achieve narrow grooves or depressions in the central area of workpiece 1.

Following the completion of the final and uppermost compacted layer of starting material, mechanical finishing of the cover face(s) of workpiece 1 may take place.

The present invention has been described in detail by reference to specific embodiments that are provided for illustration only, and the invention is not intended to be limited thereto. The person of skill will readily recognize various modifications and alterations that do not depart from the spirit and scope of the following claims.

We claim:

1. Apparatus for the production of a workpiece, comprising:
   a) a vertically movable and substantially horizontal work table the work table comprising means for holding powdered starting material such that an area covered by the powdered starting material exceeds an outer contour of the workpiece being produced; and
   b) a vertically and horizontally movable processing unit mounted over the work table, the processing unit comprising:
      i.) at least one radiation source;
      ii.) at least one guiding device, separate from any device for providing workpiece starting material, for guiding a beam emanating from the radiation source onto a work surface of the workpiece being produced;
      iii.) at least one processing device for mechanically finishing in powdered starting material at least one surface of the workpiece being produced, and iv.) at least one feeding device, separate from the at least one guiding device, for providing powdered workpiece starting material throughout the mechanical finishing, wherein the movement of each of the work table, the processing unit and the at least one processing device is controlled by a computerized control unit.

2. The apparatus according to claim 1, wherein the at least one radiation source produces electromagnetic radiation or particle radiation.

3. The apparatus of claim 1, wherein the at least one guiding device comprises at least one mirror unit, configured such that a beam emanating from the radiation device may be guided onto the work table and moved according to an outer contour of the workpiece being produced.

4. The apparatus according to claim 1, wherein the at least one processing device comprises a milling tool for a hobbing process.

5. A system for the production of a workpiece, comprising:
   a) a powdered starting material;
   b) a vertically movable and substantially horizontal work table, the work table comprising means for holding powdered starting material such that an area covered by the powdered starting material exceeds an outer contour of the workpiece being produced; and
   c) a vertically and horizontally movable processing unit mounted over the work table, the processing unit comprising:
      i.) at least one radiation source;
      ii.) at least one guiding device, separate from any device for providing powdered workpiece starting material, for guiding a beam emanating from the radiation source onto a work surface of the workpiece being produced;
      iii.) at least one processing device for mechanically finishing in powdered starting material throughout the mechanical finishing at least one surface of the workpiece being produced, and
      iv.) at least one feeding device, separate from the at least one guiding device, for providing the powdered starting material throughout the mechanical finishing, wherein the movement of each of the work table, the processing unit and the at least one processing device is controlled by a computerized control unit.

* * * * *

UNITED STATES PATENT AND TRADEMARK OFFICE
CERTIFICATE OF CORRECTION

PATENT NO. : 7,347,682 B2  Page 1 of 1
APPLICATION NO. : 10/298412
DATED : March 25, 2008
INVENTOR(S) : Andreas Lohner and Tim Sievers It is certified that error appears in the above-identified patent and that said Letters Patent is hereby corrected as shown below:

Col. 4, Line 51: Delete "table the" and insert -- table, the --

Signed and Sealed this

Twenty-fourth Day of June, 2008

JON W. DUDAS
*Director of the United States Patent and Trademark Office*